June 8, 1965  W. B. BIRTLEY  3,188,631
ELECTRONIC PLOTTING BOARD
Filed April 2, 1962  6 Sheets-Sheet 1

INVENTOR.
WILLARD B. BIRTLEY
BY Roy C. Hoggood
ATTORNEY

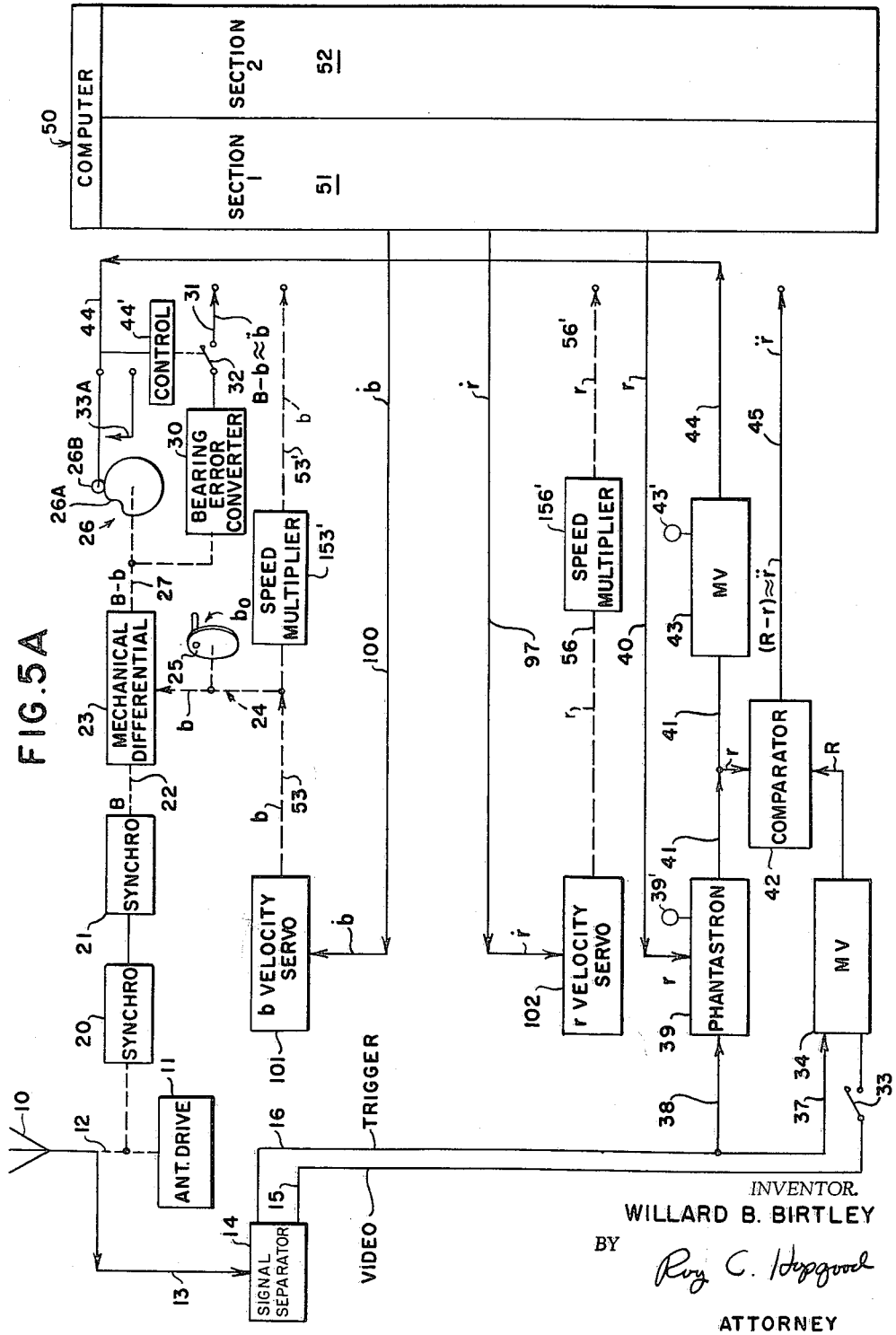

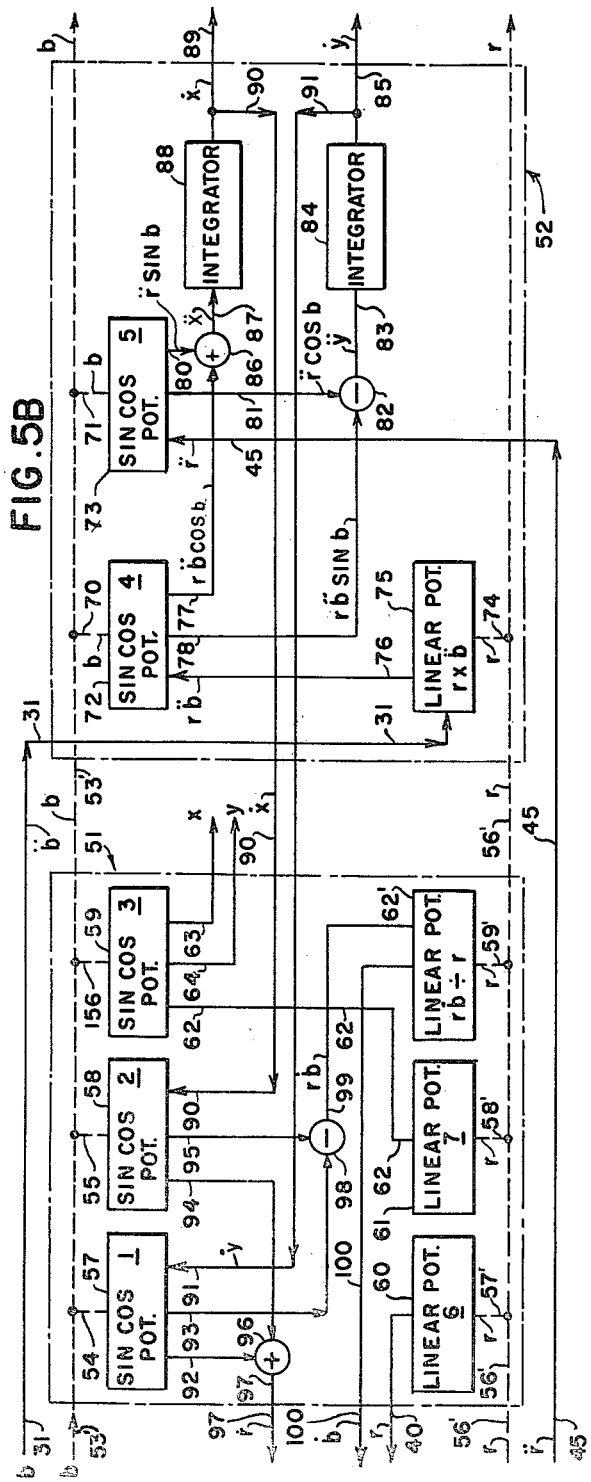

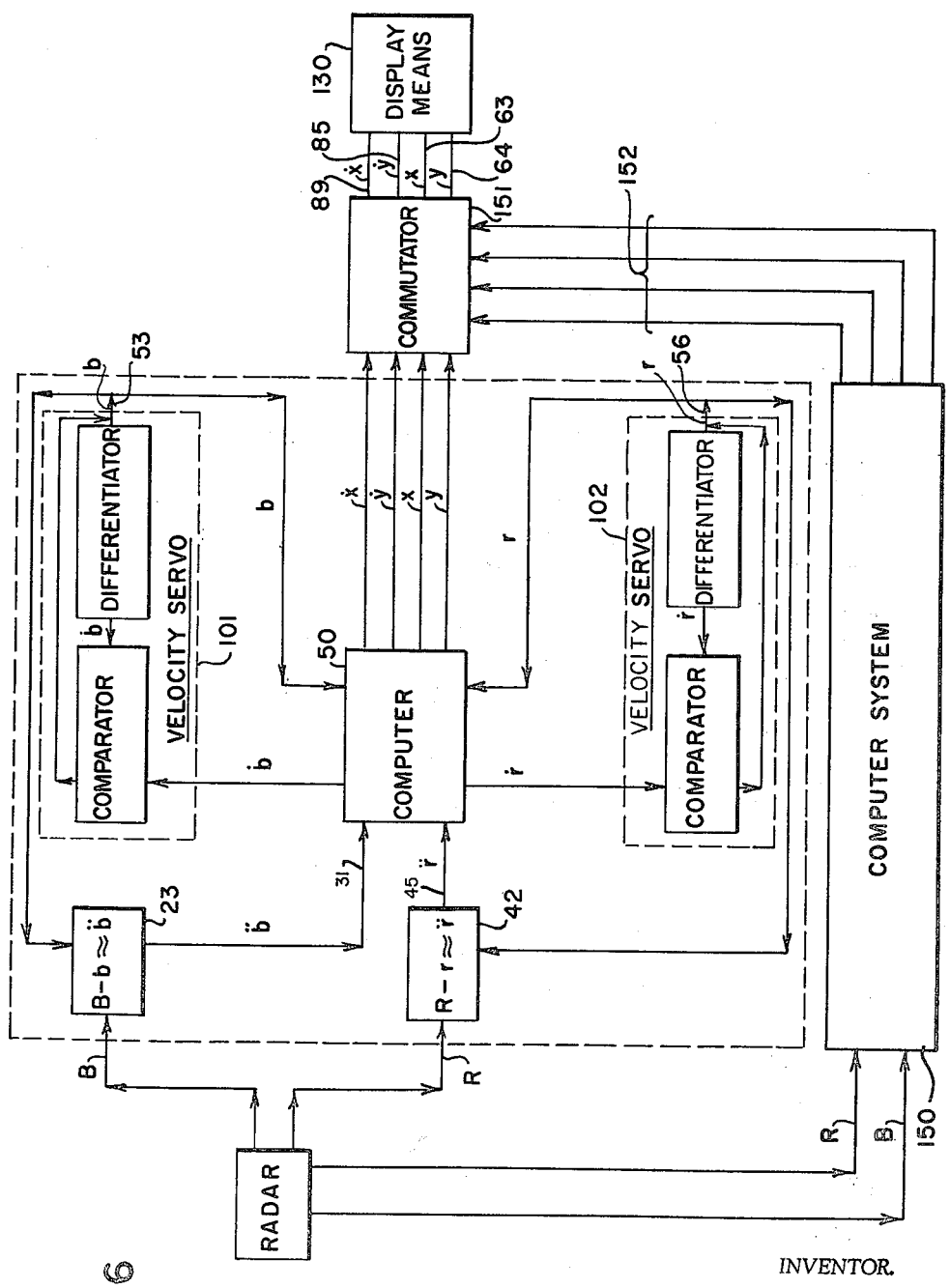

June 8, 1965  W. B. BIRTLEY  3,188,631
ELECTRONIC PLOTTING BOARD
Filed April 2, 1962  6 Sheets-Sheet 5

INVENTOR.
WILLARD B. BIRTLEY
BY
Roy C. Hoggard
ATTORNEY

June 8, 1965 W. B. BIRTLEY 3,188,631
ELECTRONIC PLOTTING BOARD
Filed April 2, 1962 6 Sheets-Sheet 6
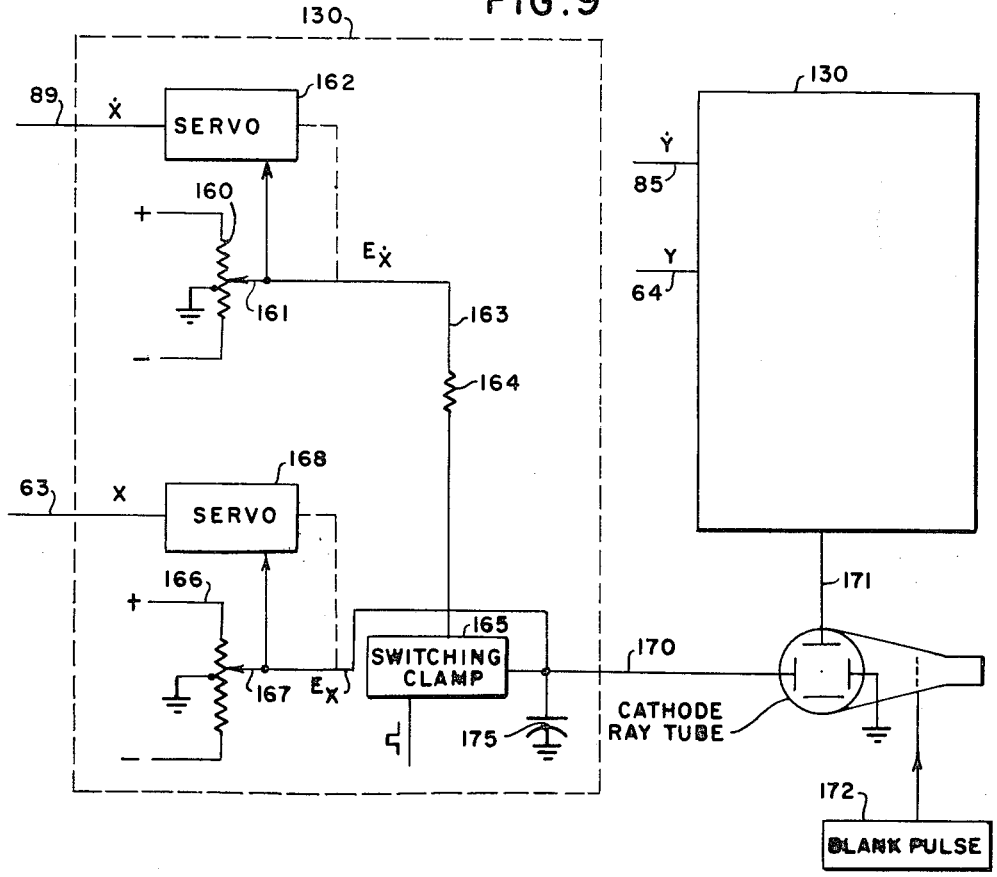
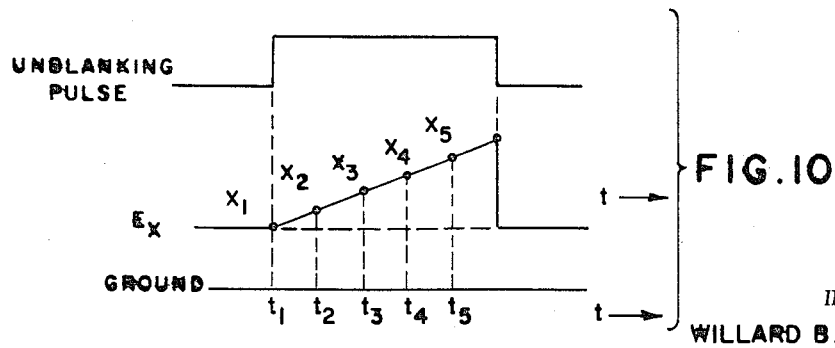
INVENTOR.
WILLARD B. BIRTLEY
BY
ATTORNEY

United States Patent Office 3,188,631
Patented June 8, 1965

3,188,631
ELECTRONIC PLOTTING BOARD
Willard B. Birtley, State College, Pa., assignor to HRB-Singer, Inc., State College, Pa., a corporation of Delaware
Filed Apr. 2, 1962, Ser. No. 184,092
19 Claims. (Cl. 343—9)

This invention relates to an electronic plotting board in which one or more ships approaching a carrier ship are automatically displayed on an electronic "plotting board." More particularly, this invention relates to a marine radar system having suitable sensing, computing and displaying equipment which will automatically detect the approach of one or more ships to the carrier ship and provide information displayed on the electronic plotting board to enable the carrier ship to make suitable maneuvers to avoid collision.

In order to avoid collision with other ships, present day radar navigation at sea depends mainly upon the use of radar, a system featuring a PPI (plan position indicator) display. In such a system, an electromagnetic signal is sent out, bounced off an approaching target ship, and received by the radar unit. The target ship is then displayed on a PPI scope. This type of radar is satisfactory for locating and navigating the ship so as to avoid prominent features and generally stationary objects, such as lighthouses, light ships, buoys, tall buildings or high land.

As applied to the problem of averting collision with other ships, present day radar navigation at sea is conducted by an operator selecting the position coordinates of a target ship from a PPI scope at selected time intervals. From this information, an operator can then manually plot relative velocity vectors on a plotting board in order to determine the relative heading and speed of targets and, in particular, their course and range at the point of closest approach. And in the case where the course of approach of a target ship is a collision course, maneuvers by the carrier ship may be quickly planned and effected to avoid collision.

This technique is inadequate since it involves a difficult reading from what may be an inaccurate or non-linear PPI scope and a number of computations and plots made to show the relative position and approach plans. All of these may constitute a source of error as well as being time consuming and unnecessary.

It is deisrable to display the velocity vectors or course of approach as well as the position of the target continuously. Since the radar is scanning continuously and only receives periodic or discontinuous signals furnishing information as to the target's position and course of approach, accurate continuous displays have been difficult to produce.

It is an object of this invention to automatically determine the velocity vectors or course of approach of selected targets and display them continuously and automatically on a PPI scope.

A further object of this invention is to continuously display the position and velocity vectors of a target relative to the ship carrying the display.

A still further object of this invention is to automatically determine the velocity vectors of a target relative to a moving object and displaying the present and predicted velocity vectors and target position.

Briefly, my invention produces position coordinates of a target ship for every antenna scan. Changes in the position coordinates may be utilized to determine relative velocity with greater accuracy and speed. In this way, changes in the course of a target ship may be detected and plotted as the changes are picked up by the antenna scan which will be, for all practical purposes, almost as quick as when the changes occur.

I provide continuous signals representing the distance of the target relative to the ship carrying the radar. I then compare successive target distance signals as determined from the radar and use the comparison as approximating the acceleration of the target relative to the carrier ship. This latter comparison is only made at such times as the radar scans the target. By comparing the differentiated distance signal with the integrated acceleration signal, I provide a control signal to alter or correct the continuous signals produced. Thus, broadly speaking, I provide continuous distance and acceleration signals and sample these signals and compare them with periodic signals emanating from the carrier ship's radar and change the continuous signals to eliminate deviation between the sampled signals and radar signals. Velocity and distance signals are displayed on a PPI scope. The scope face becomes an electronic plotting board displaying the same information as a manual plotting board.

Further, from the signals produced, I provide further signals which predict the future velocity and location of the target relative to the carrier ship.

Other objects and various further features of novelty and invention will become apparent or will occur to those skilled in the art from a reading of the following specification in conjunction with the accompanying drawings. In said drawings, which show, for illustrative purposes only, preferred forms of the invention:

FIG. 5A is a detailed schematic block diagram of the electronic plotting system of this invention;

FIG. 5B is a detailed schematic block diagram of the computer of FIG. 5A.

FIG. 6 is a schematic drawing of the electronic plotting system of this invention illustrating the operation thereof for more than one target;

FIG. 9 is a block diagram of one embodiment of the displaying means of this invention; and FIG. 10 is a graph illustrating the operation of the displaying means of FIG. 9.

Relationship of target and carrier ship

Figure 1:
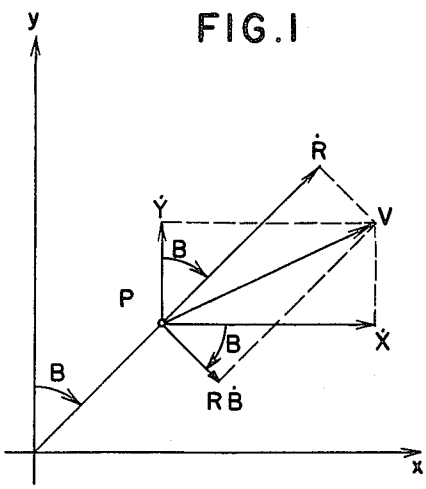
FIG. 1 is a vector diagram showing the positional coordinates of the carrier ship and a target ship.

Referring now to FIG. 1, the carrier ship is considered the point of origin and a target ship P with a relative velocity V is shown. The velocity vector V is resolved into polar vectors $\dot{R}$ and $R\dot{B}$ and cartesian vectors $\dot{X}$ and $\dot{Y}$ according to Equations 1–4 below:

$$\dot{Y} = \dot{R}\cos B - R\dot{B}\sin B \quad (1)$$
$$\dot{X} = \dot{R}\sin B - RB\cos B \quad (2)$$
$$\dot{R} = \dot{Y}\cos B + \dot{X}\sin B \quad (3)$$
$$R\dot{B} = \dot{X}\cos B - \dot{Y}\sin B \quad (4)$$

From these equations the acceleration $\ddot{X}$ in the $x$ direction and the acceleration $\ddot{Y}$ in the $y$ direction may be obtained as shown by Equations 5 and 6 below:

$$\ddot{X} = \ddot{R}\sin B + R\ddot{B}\cos B \quad (5)$$
$$\ddot{Y} = \ddot{R}\cos B - R\ddot{B}\sin B \quad (6)$$

Ship's radar

The carrier ship's radar system employed utilizes a rotating antenna such that the target will be detected during relatively short intervals. This system will produce repeating discontinuous signals sufficient to provide information as to the distance R of the target ship from the carrier ship and its bearing (or angular position) B relative to the carrier ship. More specifically the carrier ship's radar system will produce signals containing trigger and video information (which signals have the informational content to determine the ship's distance) and synchro signals, which may be mechanical (utilized to obtain the target ship's bearing).

In order to provide an effective electronic board, the linear acceleration $\ddot{R}$ of a target ship, relative to the carrier ship and the angular acceleration $R\ddot{B}$ of the target ship eltive to the carrier ship must be determined. The quantities R and B represent the true range and bearing of a target relative to the carrier ship. As used herein, capital letters (R, B, etc.) represent true quantities while small letters (r, b, etc.) represent approximated quantities. Quantities R and B are determined from the video and synchro signals produced by the ship's radar system. The computer operates on the information received and assuming acceleration quantities $\ddot{r}$, $\ddot{b}$, produces quantities r and b and $\dot{r}$ and $\dot{b}$. The quantity $R-r$ is assumed proportional to $\ddot{r}$ and the quantity $B-b$ is assumed proportional to $\ddot{b}$, the justification for which will soon be evident.

Production of continuous signals

Since the computer which is utilized in this invention does not continuously receive information as to the target position inasmuch as the antenna operates on the scanning principle, sequential bits of data must be utilized. A follow-up system is provided which produces continuous signals representing for example distance (r) and bearing (b), which is maintained between fixes and adjusted in magnitude and direction according to the errors $(R-r)$ and $(B-b)$ determined from the last fix in a manner analogous to dead reckoning. The continuous signal r is only an approximation of the actual distance R and is utilized only because it is continuous. This signal r is sampled periodically and the signals R and r are compared. Thereafter, r is caused to increase or decrease, depending upon the comparison.

Actually, the comparison between the R and r signals is between the R signal received and the r signal previously produced. That is, the R signal represents the actual distance while the r signal represents distance at the time of the previous scan. Therefore, the r signal lags the R signal. When the target is not accelerating relative to the carrier ship, $R-r=0$. When the target is accelerating, $R-r$ may be considered as an approximation of such acceleration. Since the relative velocity between the carrier ship and target does not change rapidly, the approximation is sufficiently accurate for the purposes of this invention.

Figure 2:
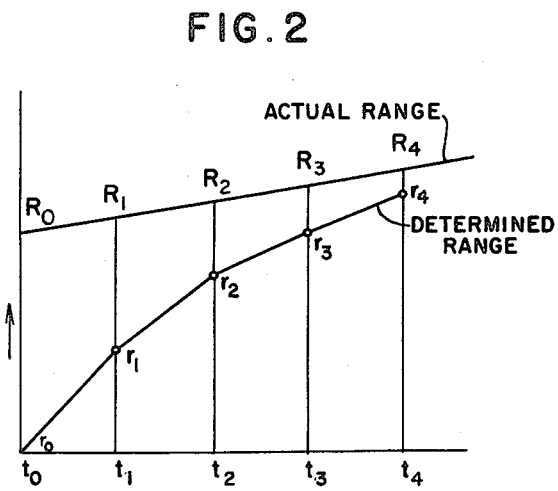
FIG. 2 is a graph having R (range) as the ordinate plotted against a time abscissa.

As shown in FIG. 2, the points $R_0$, $R_1$, $R_2$ ... $R_n$ are the true ranges of a target at scan times $t_0$, $t_1$, $t_2$ ... $t_n$. At $t_0$, $r_0$ is 0. Before any follow-up begins, the range can only be an assumed quantity. As r approaches R by steady approximations, the curve $r_0$, $r_1$ ... $r_4$ approaches the range R curve. Sensing the difference $(R_0-r_0)$ at $t_0$ and introducing this into the system as $\ddot{r}$ causes a large change in the slope $\dot{r}$ of the follow-up system. At times $t_1$, the difference $(R_1-r_1)$ is less so the acceleration is reduced and hence a change in $\dot{r}$. This continues until finally the right slope $\dot{R}=\dot{r}$, and future fixes have $R_n=r_n$. That is when $R-r$ is not 0, the quantity r is changed such that $R-r$ approaches and eventually equals 0. The $R-r$ remains 0 except when a true change in R occurs, after which r is made to follow accordingly. The bearing follow-up system functions in much the same manner.

System

As shown in FIG. 5A, an antenna 10 is rotated by antenna drive means 11 coupled thereto by mechanical coupling means 12. The output from antenna 10 is supplied over lead 13 to signal separating means 14. The video signal containing the information as to target distance is applied from the output of signal separating means 14 over lead 15, which video signal will be utilized as described hereinafter.

The trigger signal obtained through signal separating means 14 is applied to the input to separating means from a standard trigger circuit means (not shown) used in conjunction with the transmitting means (not shown) coupled to antenna 10, the trigger signal is applied over lead 16 and used in a manner which will be apparent as hereinafter described.

A synchro 20 is mechanically coupled to a coupling means 12 and its output is electrically coupled to another synchro 21. The output from synchro 21 is an angular rotational quantity B appearing on mechanical shaft 22. Mechanical differential 23 receives as inputs the quantities B and b over shafts 22 and 24 respectively. The origination of b will be described hereinafter.

The initial setting of shaft 24 at $b_0$ is determined by the setting of hand wheel 25. The output from mechanical differential 23 appears as a rotation of shaft 27 and is a quantity $B-b$ which quantity varies with B and b. This output (over shaft 27) is applied to a bearing bracket structure 26 and to a bearing error converting means 30 simultaneously. The structure of the bearing bracket will be described hereinafter. Bearing error converting means 30 converts the mechanical input to an electrical output which output also represents the quantity $B-b$. The output $B-b$ from the converting means is an electrical quantity which is an approximation of $\ddot{b}$. This output is applied over lead 31 which has a switch 32 in series therewith.

Preferably speed multipliers 153' and 156' are utilized as shown in lines 53' and 56' to provide control over the quantities $\dot{b}$ and $\dot{r}$ which are applied as mechanical inputs to the computer.

Bracketing

The video signal containing R is applied over lead 15, through a series connected switch 33 to multivibrator gate 34. The output from 34 is a signal representing R. The trigger signal is applied from lead 16 over branching leads 37 and 38 to the multivibrator gate 34 and a phantastron circuit means 39 respectively.

In order to obviate false signals from targets which are between a predetermined range, the operation of the system may be bracketed in the R and B detections. In this way, gates or brackets are impressed on R and B to establish a detecting area (shown as the shaded area in FIG. 3) and in which information signals from a target will be applied to the computer.

As shown in FIG. 5a, a cam 26A is provided having a rise which constantly engages the pivoted contact 26B. When the fall or groove of the cam is coincident with contact 26B, contact 33A will close. The fall of the cam corresponds with the bearing range which is to be bracketed. The initial setting of the fall of the cam may be fixed by mechanical means such as a hand-wheel not shown.

Phantastron 39 acts as a delay circuit and produces a pulse a predetermined time after receiving the trigger signal. This time delay determines the inner radius of the range bracket and is variable as indicated schematically by knob 39'.

The pulse emanating from phantastron 39 is applied over lead 41 to a multivibrator 43 which produces a pulse having a predetermined width. The width of this pulse is also variable as indicated schematically by knob 43'. The pulse from multivibrator 43 is applied over lead 44, through the cam-actuated contact as shown at 33A. When contact 33A is closed, a control 44' is actuated to close switch 32. Although not shown in the drawings, control 44' may also close switch 33.

Figure 3:
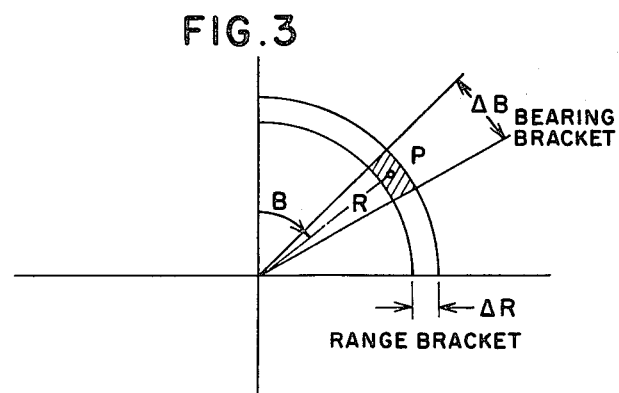
FIG. 3 is a diagram showing the detecting area in which the system will operate in shaded form, said area being defined by range and bearing brackets.

As a result, the signals $\ddot{b}$ transmitted over lead 31 and $\ddot{r}$ transmitted over lead 45 are only made to appear when the signals received are in the shaded or bracketed area shown at FIG. 3.

It is to be noted that the inputs to the computer, $\ddot{b}$ and $\ddot{r}$, which are applied over leads 31 and 45 respectively, depend upon quantities $b$ and $r$ which are internally generated utilizing the approximations mentioned previously and the computing means not yet described. Quantities $r$ and $b$ had been applied to the differential 23 and comparator 42 respectively in order to effect this approximation.

*Computer system*

The computer 50 (FIGS. 5A and 5B) may be considered as comprising two sections, a first section 51 and a second section 52. The function of the first section 51 is to receive as inputs $b, r, \ddot{b}, \ddot{r}, \dot{x}, \dot{y}$ ($\dot{x}$ and $\dot{y}$ being received from the second section 52) and produce as outputs $\dot{r}, \dot{b}, x$ and $y$. That is, the primary function of the first section is to provide a derivative of a quantity $b$ and $r$ and an integral of the functions $\dot{x}$ and $\dot{y}$ and resolve same to $\dot{r}$.

As shown in FIG. 5B, the input quantity $b$ is provided on a rotational shaft 53' which is coupled to lead-in shafts 54, 55, 156 in a conventional mechanical manner. Shafts 54, 55 and 156 rotate at the same angular velocity as shaft 53' and serve to rotate the arms of sine-cosine potentiometers 57, 58 and 59 respectively. The rotation of the arms of each of these potentiometers serves to provide two output voltages, one being a sinusoidal voltage, the amplitude of which is dependent upon the input of voltages appearing across the potentiometer, the other being of the same form as the first, except that it is displaced by 90° and therefore is cosinusoidal. That is, each of the potentiometers provides two outputs which are 90° apart, so, in effect, the output voltages represent the sine of the input voltage and the cosine of the input voltages.

The quantity representing $r$ is applied over rotational shaft 56' through coupling shafts 57', 58' and 59' to linear potentiometers 60, 61 and 62' respectively. Linear potentiometer 60 produces an output voltage representing the quantity $r$; it merely produces an electrical analogue of the mechanical signal $r$ which is the input. Linear potentiometer 61 produces a similar voltage, the amplitude of which represents $r$. This voltage is applied over lead 62 and is the input voltage to potentiometer 59. The outputs from potentiometer 59 appear across leads 63 and 64 and in effect represent voltages having a magnitude equal to $x$ and $y$ since $r \sin b = x$ and $r \cos b = y$.

*Section 2 of computer*

Before explaining the operation of potentiometers 57 and 58 and linear potentiometer 62', it will be necessary to understand how the quantities $\dot{x}$ and $\dot{y}$ are derived, and reference is made to section 2 of the computer.

The quantities which are input to section 2 are $b, r, \ddot{b}$ and $\ddot{r}$. Quantity $b$ is applied as a rotation of shaft 53'. Shaft 53' is coupled to input shaft 70 and 71 which are coupled to the arms of sine-cosine potentiometers 72 and 73 respectively.

The quantity $r$ appears as a rotation of shaft 56'. Shaft 56' is coupled in the conventional manner to a shaft 74 coupled to the arm of linear potentiometer 75. Input voltage $\ddot{b}$ appears over lead 31 and provides the voltage across linear potentiometer 75. The output from linear potentiometer 75 appears on lead 76 and is a voltage having a magnitude of $r\ddot{b}$ which voltage is applied to sine-cosine potentiometer 72. The outputs from sine-cosine potentiometer 72 appear on leads 77 and 78 and represent voltages having magnitudes equal to $r\ddot{b} \cos b$ and $r\ddot{b} \sin b$.

The quantity $\ddot{r}$ appears over lead 45 and is the electrical input to sine-cosine potentiometer 73. The outputs from sine cosine potentiometer 73 appear across leads 80 and 81 and represent voltages having magnitudes equal to $\ddot{r} \sin b$ and $\ddot{r} \cos b$ respectively. Leads 78 and 81 are coupled to a subtracting circuit 82 so that the output from 82 is a voltage quantity equal to $\ddot{r} \cos b - r\ddot{b} \sin b$, which is equal to $\ddot{y}$. The quantity $\ddot{y}$ appears on lead 83, which is immediately applied to an integrator 84. The output from 84 appearing on leads 85 is a voltage equal to $\dot{y}$.

In like manner, the voltage appearing on lead 77, $r\ddot{b} \cos b$ and the voltage appearing on lead 80, $\ddot{r} \sin b$ are applied to an adding circuit 86, the output of which appears on lead 87 and is a voltage equal to $r\ddot{b} \cos b + \ddot{r} \sin b$ which is equal to the $\ddot{x}$. $\ddot{x}$ is applied to integrator 88 the output of which appears on lead 89 equal to $\dot{x}$.

The voltages $\dot{x}$ and $\dot{y}$ appearing on leads 89 and 85 respectively are then applied to a scanning device in a manner to be described hereinafter.

The same voltages $\dot{x}$ and $\dot{y}$ are applied over leads 90 and 91 respectively to become the inputs to sine-cosine potentiometers 58 and 57 respectively shown in section 1. The outputs from sine-cosine potentiometer 57 appear on leads 92 and 93 as the quantities $\dot{y} \cos b$ and $\dot{y} \sin b$ respectively, while the outputs from sine-cosine potentiometer 58 appear on leads 94 and 95 respectively, as the voltages $\dot{x} \sin b$ and $\dot{x} \cos b$.

Leads 92 and 94 are applied to an adding circuit 96 such that the output thereof on lead 97 is a voltage equal to the sum of $\dot{x} \sin b$ and $\dot{y} \cos b$, which is equal to $\dot{r}$. The quantities appearing on leads 93 and 95 respectively are similarly applied to a subtracting circuit 98 such that the output thereof appearing on leads 99 equals the difference $\dot{x} \cos b - \dot{y} \sin b$, which is recognized as the quantity $r\dot{b}$. Linear potentiometer 62' divides the input voltage $r\dot{b}$ by $r$ appearing on shaft 59' to produce an output voltage which appears on lead 100 having a magnitude equal to $\dot{b}$.

Referring back to FIG. 5A, it is now seen that the voltage for the lead 100 representing $\dot{b}$ is applied to velocity servo 101 which controls the rotation of shaft 53. Shaft 53 is coupled through mechanical couplings to the mechanical differential 23 as described previously and to the input of the speed multiplier 153', the output of which is applied to computer 50.

The voltage $\dot{r}$ appearing over lead 97 is similarly applied to a second velocity servo 102 (FIG. 5A) which controls the rotation of shaft 56 respresenting $r$.

Figure 7:
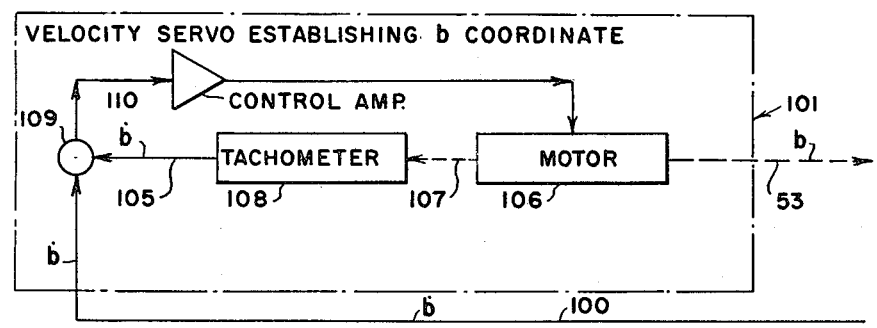
FIG. 7 is a detailed schematic drawing of the velocity servo for $b$ shown in FIG. 5A.
Figure 8:
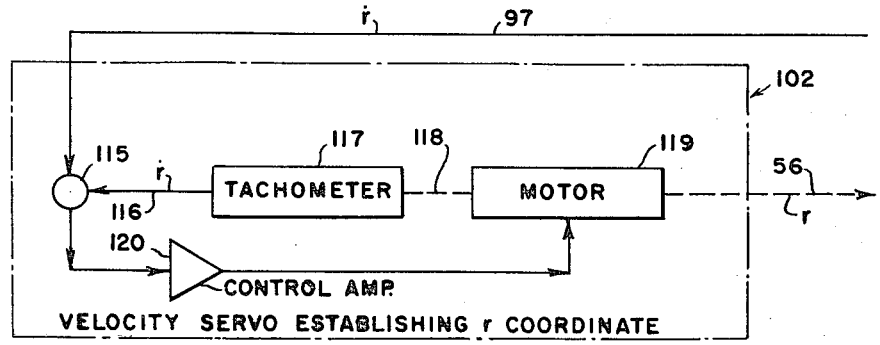
FIG. 8 is a detailed schematic drawing of the velocity servo for $r$ shown in FIG. 5B.

Referring now to FIGS. 6–8, the operation of the system may be more clearly understood. The output from the radar means comprises a bearing signal B and a video signal having distance or range information R. A velocity servo 101 (FIG. 7) establishes $b$ coordinate signal while the velocity servo 102 (FIG. 8) establishes the $r$ coordinate signal. The signal B (FIG. 6) is applied to a comparator 23 while the signal R is applied to comparator 42. The output from comparator 23 is a quantity $B-b$ which is assumed equal to $\ddot{b}$ and the output from comparator 42 is a quantity $R-r$ which is assumed equal to $\ddot{r}$. The signals $\ddot{b}$ and $\ddot{r}$ are applied to the computer 50 over leads 31 and 45 to produce the velocity components $\dot{b}$ and $\dot{r}$ (resolved into $\dot{x}, \dot{y}$) and $x$ and $y$ in a manner heretofore described.

If more than one target is to be shown on display means 130, a second computer system 150 must be utilized and $\dot{x}, \dot{y}, x, y$ signals for this target will be applied over leads 152 to a commutator 151 for selective application to display means 130. Commutator 151 may operate preferably at a 30 cycle/second rate to eliminate possible flicker.

Referring now to FIG. 7, if $B-b=0$ the quantities $\dot{b}$ appearing on lead 100 and 105 respectively would be equal. Servo motor 106 producing rotational quantity $b$ over shaft 53 and over shaft 107 would be rotating at a constant velocity. Tachometer 108 coupled to shaft 107 which differentiates $b$ would produce a voltage over lead 105 equal to $\dot{b}$ and difference detecting means 109 would produce no output. When $B-b$ increases, the voltage $\dot{b}$ over lead 100 would exceed the voltage $\dot{b}$ on lead 105, a correcting signal would then be produced at difference detecting means 109 and applied to control amplifier 110. The output from control amplifier 110 would cause the speed of servo motor 106 to increase and hence rotational quantity $b$ on shaft 53 would increase. In this manner $B-b$ would approach and become 0.

Velocity servo 102 operates similarly. When $R-r$ is not 0, the signals on leads 97 and 116 representing $\dot{r}$ are unequal. Difference detecting means 115 produces a correcting signal which is applied to control amplifier 120. The output from control amplifier 120 increases or decreases (as the case may be) the speed of servo motor 119. The change in speed of motor 119 will produce a change in the output of tachometer 117, which differentiates $r$, and hence a change in the voltage $\dot{r}$ over lead 116. In this manner $R-r$ would approach and become 0.

*Display*

Figure 4:
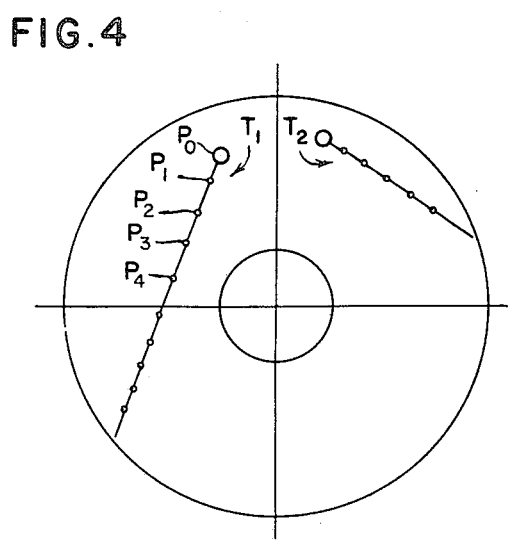
FIG. 4 is a graphical representation of the display obtained with this invention.

The display shown at FIG. 4 comprises two targets, $T_1$ and $T_2$. For target $T_1$, there are shown a plurality of points $P_0$, $P_1$, $P_2$, etc. which lie on the velocity vector beginning at point $P_0$. It is to be noted that the display at FIG. 4 not only shows the position of each target relative to the carrier ship but also shows the velocity vector. The velocity vector is oriented at a certain direction to indicate the direction of movement. The magnitude of the velocity can be relatively determined by noting the length of the velocity vector between the various points $P_0$, $P_1$, etc. for reasons which will be apparent.

The signals appearing on leads 63 and 64 of FIG. 6 represent the quantities $x$ and $y$ respectively and the signals appearing on leads 89 and 85 represent the quantities $\dot{x}$ and $\dot{y}$. These signals are applied to the display means shown in FIG. 9. In order to determine the initial position $P_0$ which will correspond to the location of the target, it is merely necessary to apply the voltages representing $x$ over 63 and $y$ over 64 to the horizontal and vertical deflection plates represented on the cathode ray tube. In order to produce the velocity vector, the velocity components $\dot{x}$ and $\dot{y}$ are applied to suitable circuitry to develop sweep voltages. The addition of these sweep voltages to the fixed voltage or D.C. level representing the quantities $x$ and $y$ will produce a line representing the velocity vector. That is, the horizontal voltage applied to the horizontal deflection plates has two components; a D.C. voltage equal to $x$ and a sweep voltage having a slope equal to $\dot{x}$ (voltage=$\dot{x}x$ time). The voltage applied to the vertical deflection plate also has two components; a D.C. voltage equal to $y$ and a sweep voltage having a slope equal to $\dot{y}$.

As shown in FIG. 9, the $x$ voltage appearing across lead 63 is applied to a servo 168 which causes a contact arm 167 of a potentiometer to vary. A fixed voltage is applied over lead 166 to this potentiometer. The output appearing on contact arm 167 represents a D.C. voltage having a level corresponding to $x$. This voltage is applied directly across the capacitance 175 such that capacitance 175 is at the voltage level $E_x$.

The velocity vector $\dot{x}$ over lead 89 is similarly applied to a servo device 162 in conjunction with potentiometer 160 and contact arm 161 so that a voltage $E_{\dot{x}}$ appears on line 163. A resistor 164 is in series with capacitor 175 through a switching clamp 165. When an unblanking pulse of a width shown in FIG. 10 is applied to the switching clamp, the voltage $E_{\dot{x}}$ is impressed across the resistor 164 and capacitors 175 which are in series. The values of the resistors 164 and capacitors 175 are so chosen that the output on lead 170 from capacitors 175 is an integration of the voltage $E_{\dot{x}}$. Since the capacitor has previously reached the D.C. level of $E_x$, the output over lead 170 equals the voltage $E_x$ plus the integral of the voltage $E_{\dot{x}}$. This is shown in FIG. 10. It is to be understood that the unblanking pulse applied to the switching clamp is also applied to the cathode of the cathode ray tube for conventional unblanking purposes.

The purpose of the switching clamp, therefore, is first to switch the voltage $E_{\dot{x}}$ over the resistor 164 and capacitor 175 for integration purposes and second, to clamp that voltage to the D.C. level voltage $E_x$.

It will be understood that the voltage $E_{\dot{x}}$ will determine the horizontal component of the velocity vector. If the voltages $E_{\dot{x}}$ and $E_{\dot{y}}$ (representing the corresponding velocity component in the $y$ direction) have a predetermined ratio, the slope of the velocity vector shown in FIG. 4 will be independent of the absolute velocity. In order to provide an indication of magnitude of velocity, there is provided a position or brightening pulse generator which applies a series of timed pulses to the grid of the cathode ray tube; this in effect is a modulation of the $z$ axis of the cathode ray tube. These pulses actually produce brightened spots shown as $P_0$, $P_1$, $P_2$, etc. A time interval between these brightening pulses remains constant. However, if the magnitudes of the velocity components increase, the line producing the velocity vector will actually be produced quicker, the velocity vector will be longer and, therefore, the distance between brightened spots $P_0$, $P_1$, $P_2$, etc. will be greater. Thus, the spots $P_1$, $P_2$, etc. are future coordinates corresponding to time $t_1$, $t_2$, etc. such as at five, ten, etc. minutes after the position $P_0$ corresponding to time $t_0$.

The use of brightening pulses is conventional and merely requires the application of a signal to a grid of a cathode ray tube to control the quantity of electrons through the grid during that particular time.

It is to be understood that while I have shown a switching clamp 165 used in conjunction with the capacitor 175 other means for integrating the velocity voltage $E_{\dot{x}}$ or the voltage $\dot{x}$ appearing on lead 89 and adding that voltage to the voltage corresponding to the $x$ component of distance 63 may be utilized.

Thus, there has been shown a novel system for providing the location of a target at the location of one or more targets from a carrier ship, the course of approach, the relative velocity both in magnitude and direction.

While the foregoing description sets forth the principles of the invention in connection with specific apparatus, it is to be understood that this description is made only by way of example and not as a limitation of the scope of the invention as set forth in the objects thereof and in the accompanying claims.

I claim:

1. An electronic plotting board system in which the approach of a target ship to a carrier ship is automatically displayed comprising radar means on said carrier ship to produce a video signal representing the distance R and a bearing signal representing the bearing position B of said target ship relative to said carrier ship, said video signal including transmitted and received signals, first and second linear approximating means, said first linear approximating means providing a first output signal to approximate the linear distance of said target ship relative to said carrier ship, said second linear approximating means being coupled to said radar means and said first approximating means and responsive to said video signal and said first output signal to provide a second output signal to approximate the linear acceleration of said target ship relative to said carrier ship, said second linear approximating means including means to subtract said video and first output signal to thereby produce said second output signal, differentiating means coupled to said first linear approximating means to differentiate said first output signal to produce a first velocity signal, integrating means coupled to said second linear approximating means to integrate said second output signal to produce a second velocity signal, comparison means to compare said first and second velocity signals, and means responsive to the output of said comparison means to vary the output of said first approximating means in accordance therewith.

2. The electronic plotting board system of claim 1 in which said first linear approximating means include a motor driving a shaft, said differentiating means includes a tachometer means coupled to said shaft, whereby said comparison means compares the output of said tachometer means and said second velocity signal.

3. An electronic plotting board system in which the approach of a target ship to a carrier ship is automatically displayed comprising radar means on said carrier ship to produce a video signal representing the distance R and a bearing signal representing the angular position B of said target ship relative to said carrier ship, first and second linear approximating means, said first linear approximating means providing a first output signal to approximate the linear distance of said target ship relative to said carrier ship, said second linear approximating means being coupled to said radar means and said first approximating means and responsive to said video signal and said first output signal to provide a second output signal to approximate the linear acceleration of said target ship relative to said carrier ship, said second linear approximating means including means to subtract said video and first output signal to thereby produce said second output signal, differentiating means coupled to said first linear approximating means to differentiate said first output signal to produce a first velocity signal, integrating means coupled to said second linear approximating means to integrate said second output signal to produce a second velocity signal, comparison means to compare said first and second velocity signals, means responsive to the output of said comparison means to vary the outputs of said first approximating means in accordance therewith, first and second bearing approximating means, said first bearing approximating means providing a first bearing output signal to approximate the bearing of said target ship relative to said carrier ship, said second bearing approximating means being coupled to said radar means and said first bearing approximating means and responsive to said bearing signal and said first bearing output signal to provide a second bearing output signal to approximate the angular acceleration of said target ship relative to said carrier ship, said second bearing approximating means including means to subtract said bearing signal and said first bearing output signal to thereby produce said second bearing output signal, bearing differentiating means coupled to said first bearing approximating means to differentiate said first bearing output signal to produce a first angular velocity signal, bearing integrating means coupled to said second bearing approximating means to integrate said second bearing output signal to produce a second angular velocity signal, bearing comparison means to compare said first and second angular velocity signals, and means responsive to the output of said bearing comparison means to vary the output of said first bearing approximating means in accordance therewith.

4. The electron plotting board system of claim 3, comprising a computing means including a first means coupled to said first and second linear and bearing approximating means and responsive to the output thereof to produce target velocity and distance component signals relative to said carrier ship, said component signals representing horizontal and vertical components for each of said velocity and distance components respectively, and display means coupled to and responsive to the output of said computing means to display the distance of said target relative to said carrier ship and to display the velocity of said target ship relative to said carrier ship.

5. The electron plotting board system of claim 4 in which said display means includes first adding means to add the horizontal component signals respective of the velocity and distance, second adding means to add the vertical component signals respective of the velocity and distance, and applying means coupled to and responsive to said first and second adding means to separately apply said added signals to said display means.

6. The electronic plotting board system of claim 5 in which said displaying means includes a cathode ray tube and said applying means includes means responsive to said first and second adding means to apply the output of said first adding means to the horizontal deflection circuit of the cathode ray tube and the output of said second adding means to the vertical deflection circuit thereof.

7. The electronic plotting board system of claim 5 including means for displaying the future distance and bearing of said target relative to said carrier ship, said velocity and distance signals having direct current signals, and including means to integrate said velocity signal and add said distance and integrated signals to said display means.

8. The electronic plotting board system of claim 7 in which said display means includes a cathode ray tube, and means for applying a series of equally spaced brightening pulses to the grid of said tube while said distance and velocity signals are displayed.

9. The electronic plotting board system of claim 4 including means for displaying the future distance and bearing of said target relative to said carrier ship.

10. The electronic plotting board system of claim 3, including resolving means responsive to said first and second linear and bearing approximating means to produce signals representing horizontal and vertical components of acceleration respectively first component integrating means separately integrating each of said resolved quantities to produce horizontal and vertical components of velocity respectively thereof, and second resolving means responsive to said first linear and said bearing approximating means to produce signals representing the horizontal and vertical components of distance, and means responsive to said first integrating means and second resolving means to indicate the velocity and position of said target ship relative to said carrier ship.

11. The electronic plotting board system of claim 10 comprising bracketing structure to limit application of signals when said target is beyond predetermined ranges of bearing and distance.

12. The electronic plotting board system of claim 3 in which said first linear approximating means include a motor driving a shaft, said differentiating means includes a tachometer means coupled to said shaft, whereby said comparison means compares the output of said tachometer means and said second velocity signal, and in which said first bearing approximating means includes a second motor driving a second shaft, said bearing differentiating means includes a second tachometer means coupled to said second shaft, whereby said bearing comparison means compares the output of said tachometer means and said second angular velocity signal.

13. The electronic plotting board system of claim 3 in which the distance signal from said first approximating means and said bearing signal from said first bearing approximating means are applied to display means to display the distance and bearing of said target, said display means including predicting means for displaying the future distance and bearing of said target.

14. The electronic plotting board system of claim 13 in which said display means display the relative velocity of said target.

15. An electronic plotting board system in which the approach of a target ship to a carrier ship is automatically displayed comprising radar means on said carrier ship to produce a video signal representing the distance R and a bearing signal representing the bearing position B of said target ship relative to said carrier ship, first and second linear approximating means, said first linear approximating means providing a first output signal to approximate the linear distance of said target ship relative to said carrier ship, said second linear approximating means being coupled to said radar means and said first approximating means and responsive to said video signal and said first output signal to provide a second output signal to approximate the linear acceleration of said target ship relative to said carrier ship, said second linear approximating means including means to subtract said video and first output signal to thereby produce said second output signal, differentiating means coupled to said first linear approximating means to differentiate said first output signal to produce a first velocity signal, integrating means coupled to said second linear approximating means to integrate said second output signal to produce a second velocity signal, comparison means to compare said first and second velocity signals, means responsive to the output of said comparison means to vary the output of said first approximating means in accordance therewith, and bracketing means allowing a distance signal to be applied to said system when the target is within a predetermined range.

16. The electronic plotting board system of claim 15 in which said bracketing means include a switch, said video signal passing through said switch when closed, and gating means to close said switch for a predetermined time interval at a predetermined time after said transmitted signal is transmitted.

17. The electronic plotting board system of claim 16 in which said gating means include a phantastron circuit and pulse producing means in series, said pulse producing means producing pulses of controlled width.

18. An electronic plotting board system comprising means to determine the distance and bearing of a target from a reference location and the relative velocity, including display means to display said distance and bearing determination and also including means to display said relative velocity, said means including predicting means for displaying the future distance and bearing of said target.

19. The electronic plotting board system of claim 18, further including means to apply a plurality of equally spaced timing signals to the display means to provide the said indication of relative velocity.

References Cited by the Examiner
UNITED STATES PATENTS

| | | | |
|---|---|---|---|
| 2,917,737 | 12/59 | Close et al. | 343—7.3 |
| 3,018,959 | 1/62 | Thomas. | |
| 3,054,101 | 9/62 | Pastoriza | 343—7 |
| 3,064,250 | 11/62 | Close | 343—5 X |

FOREIGN PATENTS 750,005  6/56  Great Britain.

CHESTER L. JUSTUS, *Primary Examiner.*

KATHLEEN CLAFFY, *Examiner.*